United States Patent [19]

Burnham

[11] 3,813,113

[45] May 28, 1974

[54] RETRACTION MECHANISM FOR A PROTRUDING PART OF A VEHICLE

[75] Inventor: Horace James Burnham, Nantwich, England

[73] Assignee: The Secretary of State for Defence, London, England

[22] Filed: Mar. 12, 1971

[21] Appl. No.: 123,754

[52] U.S. Cl.......................... 280/150 R, 248/475 B
[51] Int. Cl............................................ B60r 27/00
[58] Field of Search................ 280/150 R; 267/155; 248/475 B; 186/69 R

[56] References Cited
FOREIGN PATENTS OR APPLICATIONS
1,479,428   3/1966   France ........................... 248/475 B Primary Examiner—Robert R. Song
Attorney, Agent, or Firm—Cushman, Darby & Cushman

[57] ABSTRACT

A retraction mechanism for protruding parts of vehicles such for instance as mascots, and comprises a toggle spring or springs connected between the part and the vehicle and arranged to retract the part when the part is struck with a predetermined force, thus avoiding possible damage to pedestrians.

7 Claims, 5 Drawing Figures

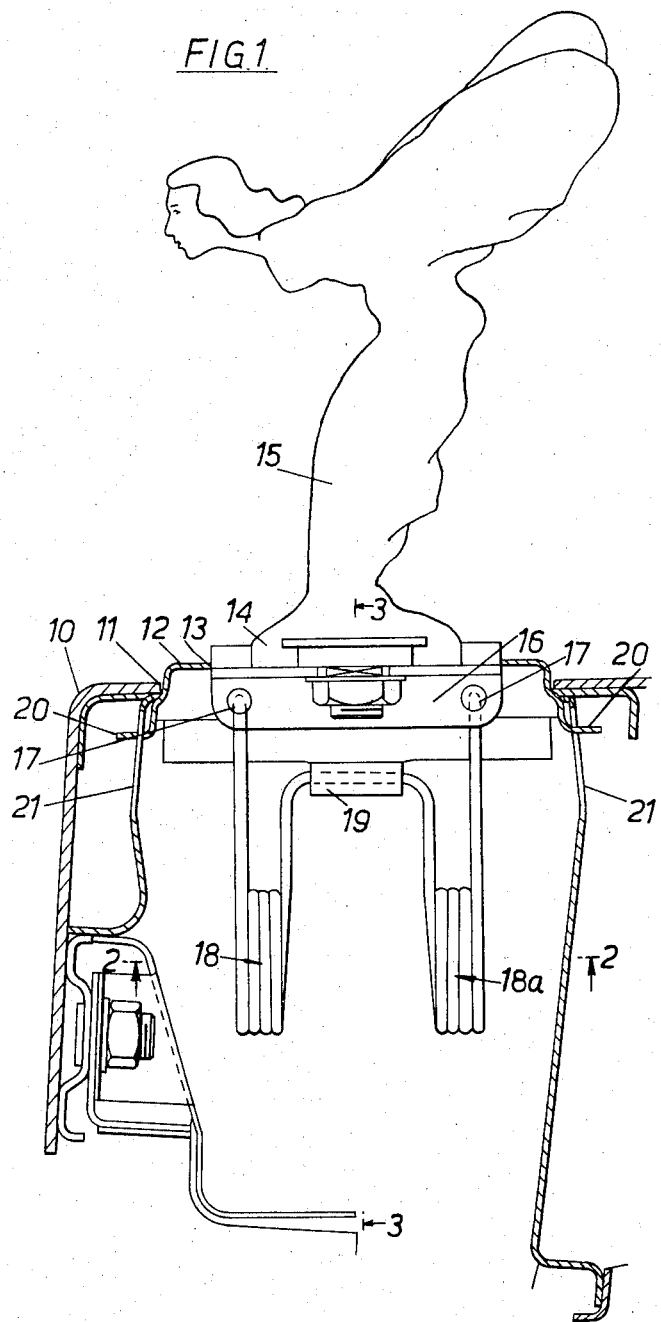

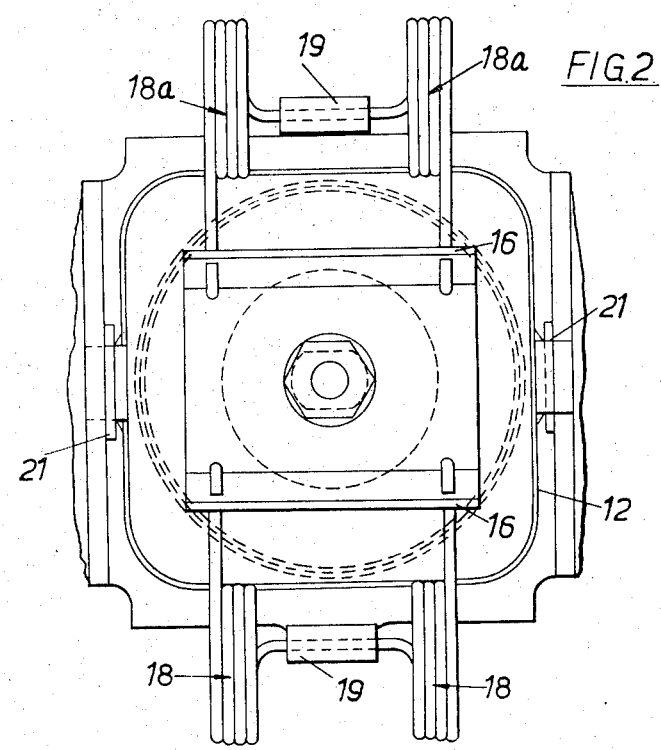
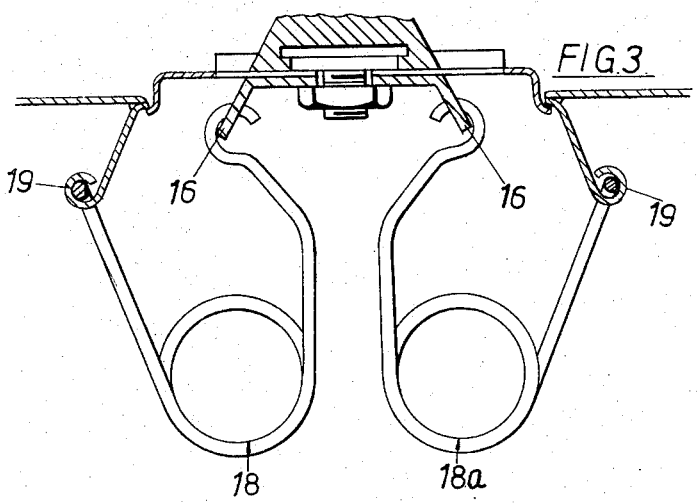

RETRACTION MECHANISM FOR A PROTRUDING PART OF A VEHICLE

This invention relates to a retraction mechanism for a protruding part of a vehicle and is particularly though not exclusively applicable to a retraction mechanism for the mascot of a motor car.

It is sometimes necessary to arrange that a protruding part of a vehicle should retract when struck by an object; this is particularly the case where protrusions such as mascots on motor vehicles are concerned, since a rigidly mounted mascot could cause considerable damage to a pedestrian struck by the mascot.

It will be appreciated that the retraction mechanism should positively and quickly retract the protruding part when triggered by being struck by another object with a predetermined minimum force.

The present invention provides such a mechanism.

According to the present invention a retraction mechanism for a protruding part of a vehicle comprises at least one toggle spring connected to the protruding part and to the vehicle and having a first condition in which it holds the protrusion in its protruding position and a second condition in which it holds the part at least partly retracted, the spring or springs being adapted to 'toggle' and positively retract the part from its protruding position when it is struck with a predetermined minimum force.

Preferably each said toggle spring comprises two operating arms whose interconnection forms a coil spring adapted to rotate the arms away from one another, the operating arms being mounted on the vehicle and protrusion so that in one position the spring force has a component acting to push the protrusion outwardly against a seating, so that when sufficient depression of the protrusion takes place the mounting of the operating arm on the protrusion moves so as to cause the spring force to act inwardly and retract the protrusion. Said seating preferably comprises a loose part which falls away when the retraction commences to leave a sufficient hole for the protrusion to retract.

There are preferably a plurality of the toggle springs mounted symmetrically about the line of retraction.

In one embodiment the protrusion comprises the mascot of a motor vehicle.

The invention will now be particularly described with reference to the accompanying drawings in which:

FIG. 1 is a vertical sectional view through the forward portion of the bonnet of a motor vehicle showing a mascot and its retraction mechanism in its normal position according to the invention:

FIG. 2 is a sectional view on the line 2—2 of FIG. 1;

FIG. 3 is a sectional view on the line 3—3 of FIG. 1;

Figure 4:
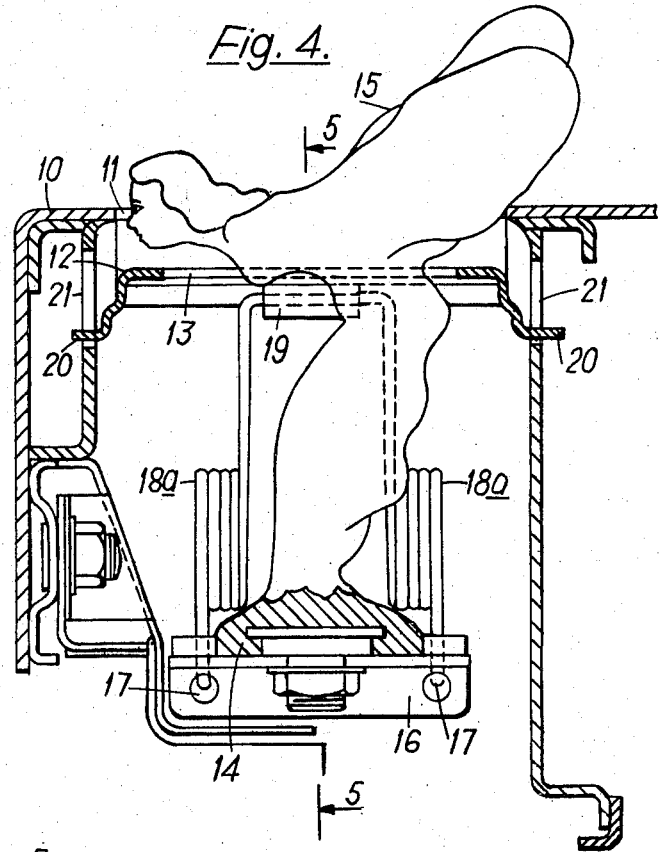
FIG. 4 is a vertical section view through the forward portion of the bonnet of a motor vehical and similar to FIG. 3 but showing the mascot in its retracted position.
Figure 5:
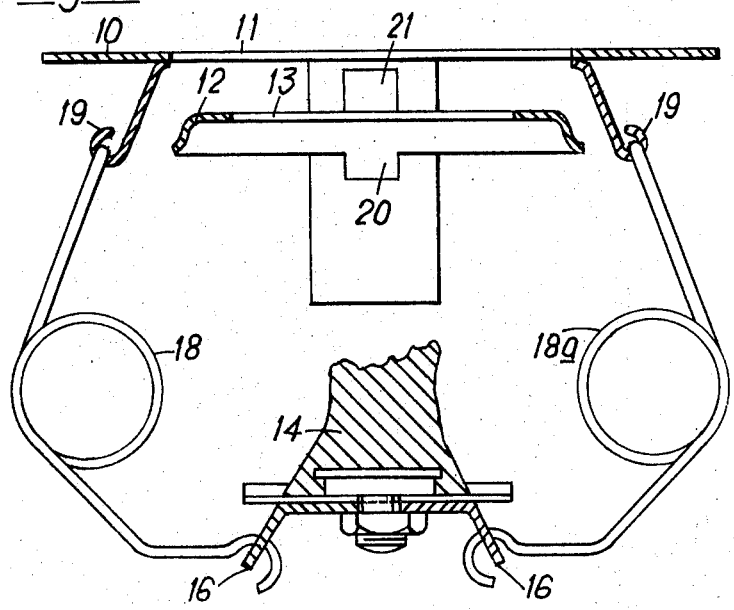
FIG. 5 is a sectional view taken on the line 5—5 of FIG. 4.

In FIG. 1 there is shown a false header tank 10 which comprises the forward part of the bonnet of a motor vehicle. The header tank 10 has an aperture 11 within which is seated a loose part 12, itself having an aperture 13 within which is seated the base 14 of a mascot 15.

The mascot is provided with a pair of lugs 16 which are apertured at 17 to provide anchorage points for the extremities of operating arms of toggle springs generally indicated at 18a.

Each toggle spring comprises a pair of operating arms interconnected by a coil spring section so formed as to force the arms apart in a plane at right angles to the arms of the spring coil, and in the illustrated embodiment corresponding ones of the operating arms on each of a pair of the springs are joined together, and in fact the pairs of toggle springs are each made up of a single length of spring material.

The operating arms of the toggle springs not connected to the lugs 16 are connected to projections 19 from the fixed structure of the false header tank.

In order to restrict movement of the loose part 12 when the mascot is retracted, the loose part is provided with fore and aft extending tabs 20 which engage in respective grooves 21 in the fixed header tank structure. These grooves stop short so that they only allow the loose part 12 to fall a predetermined distance inside the header tank.

As can best be seen from FIG. 3, when the toggle springs 18 and 18a and mascot 15 are in their normal operating position as described above, the force exerted by the operating arms on the mascot base is generally in an inward facing direction but having a component in the upward direction. This component causes the mascot to be pushed against its seating on the loose part 12, and similarly causes the loose part to be pushed against its seating in the false header tank 10. Therefore, in its operating position the system is stable, and the force exerted by the springs can be predetermined to give the mascot mounting sufficient degree of rigidity.

If the mascot 15 is struck by a body or otherwise deflected from its normal position, one or both of the lugs 16 will be depressed. When the lug 16 is depressed by a sufficient amount, the direction of the force changes until it has a downward component. At this point the mechanism toggles and it will be appreciated that the downward force causes the mascot 15 and loose piece to retract, the downward component of the force exerted by the springs increasing as the degree of retraction increases until it reaches a maximum value. The loose piece 12 is allowed to fall constrained by the engagement of the tabs 20 and grooves 21 until it reaches the end of the grooves; after this point the mascot continues to retract by itself.

In the present instance the mascot 15 is not caused to fully retract but brings up against the bottom of the header tank with a small portion still exposed as shown in FIG. 4.

It will be seen that this mechanism provides a quick and positive retraction of the mascot 15 when triggered by a predetermined load. Although the above embodiment relates to a mascot, it is evident that the mechanism could be used in a number of applications to retract various kinds of protruding parts of vehicles.

It will be appreciated that if necessary it would be possible to provide an electrical or mechanical locking device to hold the protrusion in position when the car is stationary and prevent malicious triggering of the retraction mechanism.

I claim:

1. A vehicle having a part, said part having a protruding position and a retracted position, a housing located in said vehicle adjacent to said part and arranged to at least partly house said part when said part is in its retracted position, at least one toggle spring having two end connections, means connecting one of said end connections to said part and the other of said end connections to said vehicle, said end connections exerting a force away from one another and having a line of action of said force being such that when said part is in said protruding position said end connections act to hold said part in said protruding position and when said part is moved by a predetermined extent, one said end connection and said line of action of said force being moved such that said force acts on said part to move it to and maintain it in said retracted position.

2. A vehicle as in claim 1 having a seating normally arranged to cover said housing, said seating comprising a loose part arranged to fall away on initiation of the retraction and to leave a sufficiently large hole through which the protrusion can be retracted into said housing.

3. A vehicle as claimed in claim 2 and in which said loose part has projections which engage in slots and constrain movement of the loose part to a predetermined direction.

4. A vehicle as claimed in claim 3 and in which there is a stop or stops which allow only predetermined amount of movement of the loose plate.

5. A vehicle as claimed in claim 1 and in which there are four said toggle springs mounted substantially symmetrically with respect to the direction of retraction.

6. A vehicle as claimed in claim 5 and in which said four springs comprise two pairs each made up of a single length of spring material.

7. A vehicle as claimed in claim 1 and in which said protrusion comprises the mascot of a motor vehicle.

* * * * *